United States Patent
Sandoval et al.

(10) Patent No.: US 11,575,342 B2
(45) Date of Patent: Feb. 7, 2023

(54) MOTOR DRIVER CONTROLLER ANALYSIS DEVICE

(71) Applicant: Lennox Industries Inc., Richardson, TX (US)

(72) Inventors: Jose Sandoval, The Colony, TX (US); Palanivel Subramaniam, Richardson, TX (US); Harvey Veselka, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 332 days.

(21) Appl. No.: 17/028,808

(22) Filed: Sep. 22, 2020

(65) Prior Publication Data

US 2022/0094298 A1     Mar. 24, 2022

(51) Int. Cl.
| | |
|---|---|
| *G05B 5/00* | (2006.01) |
| *H02H 7/08* | (2006.01) |
| *H02P 1/00* | (2006.01) |
| *H02P 3/00* | (2006.01) |
| *H02P 29/60* | (2016.01) |

(52) U.S. Cl.
CPC .................................. *H02P 29/67* (2016.11)

(58) Field of Classification Search
CPC ........................................................ H02P 29/67
USPC ........................................................ 318/459
See application file for complete search history.

(56) References Cited

U.S. PATENT DOCUMENTS

| | | | | |
|---|---|---|---|---|
| 6,731,450 B1* | 5/2004 | Codilian | .............. | G11B 33/144 |
| | | | | 360/75 |
| 2002/0185986 A1* | 12/2002 | Seki | .......... | H02P 6/10 |
| | | | | 318/599 |
| 2008/0036415 A1* | 2/2008 | Kaizuka | .............. | H02P 21/0003 |
| | | | | 318/730 |
| 2015/0357954 A1 | 12/2015 | Kim | | |
| 2019/0354186 A1* | 11/2019 | Bae | .......... | G06F 3/015 |

FOREIGN PATENT DOCUMENTS

| | | |
|---|---|---|
| EP | 3229369 A1 | 10/2017 |
| JP | 2012050261 A | 3/2012 |

OTHER PUBLICATIONS

European Patent Office, Extended European Search Report, Application No. 21196835.9, dated Feb. 15, 2022, 5 pages.

* cited by examiner

*Primary Examiner* — Erick D Glass
(74) *Attorney, Agent, or Firm* — Baker Botts L.L.P.

(57) ABSTRACT

A motor driving system includes motor driving circuitry configured to operate an electric motor. The system further includes a controller that is configured to send a signal to energize the electric motor and to measure a back electromotive force voltage of the electric motor. The controller is further configured to determine a temperature value based on the measured back electromotive force voltage using a back electromotive force voltage mapping that maps back electromotive force voltages to temperature values. The controller is further configured to determine an expected winding resistance value based on the determined temperature value using a resistance mapping that maps winding resistance values to temperature values. The controller is further configured to measure a winding resistance of the electric motor, to compare the measured winding resistance of the electric motor to the expected winding resistance value, and to output a match result indication based on the comparison.

20 Claims, 4 Drawing Sheets

MOTOR DRIVER CONTROLLER ANALYSIS DEVICE

TECHNICAL FIELD

The present disclosure relates generally to motor driver controllers, and more specifically a motor driver controller analysis device.

BACKGROUND

In a motor driving system, a motor driver controller is typically used to control an electric motor to power a load. For example, an electric motor driving system may be employed to control components of a Heating, Ventilation, and Air Condition (HVAC) system. In this example, the motor driving system may be configured to control the operation of an electric motor for a furnace, a condenser, an air handler, or any other suitable type of HVAC equipment. In other examples, the motor driving system may be employed to control the operation of electric motors for any other suitable type of system or application. One of the technical challenges of a motor driving system is ensuring that the correct type of electric motor is connected to a motor driver controller. Operating the incorrect electric motor with the wrong settings may result in underpowering the electric motor or overpowering the electric motor which may cause damage to the electric motor and/or its load. For example, overpowering an electric motor may cause the electric motor to overheat which may trigger thermal protection and cause the electric motor to shut down. In this case, the motor driving system will experience downtime until the electric motor can be replaced. Existing motor driving systems lack the ability to detect whether the correct electric motor has been connected to a motor driver controller. Existing systems also lack the ability to resolve mismatches between incorrect combinations of electric motors and motor driver controllers.

SUMMARY

The system disclosed in the present application provides a technical solution to the problems discussed above by using a motor driver controller that is configured to determine whether the correct or expected electric motor has been connected to the motor driver controller. This process allows the motor driver controller to ensure that the appropriate electric motor is connected to the motor driver controller before fully utilizing the electric motor. This allows the motor driver controller to safely operate the electric motor without potentially underpower the electric motor or overpowering the electric motor. This process allows the motor driver controller to operate the electric motor while avoiding damaging an electric motor and/or its load.

The motor driver controller is also configured to detect when an incorrect electric motor has been connected to the motor driver controller. In this case, the motor driver controller will notify an operator about incorrect electric motor that is connected to the motor driver controller. The motor driver controller may be further configured to dynamically change settings that are used to control the electric motor based on the type of electric motor that is connected to the motor driver controller. This process allows the motor driver controller to safely operate the electric motor that is connected to the motor driver controller using the appropriate motor settings.

In one embodiment, a motor driving system includes motor driving circuitry configured to operate an electric motor. The system further includes a motor driver controller that is configured to send a signal to energize the electric motor and to measure a back electromotive force voltage of the electric motor. The motor driver controller is further configured to determine a temperature value based on the measured back electromotive force voltage using a back electromotive force (EMF) voltage mapping. The back EMF voltage mapping maps back EMF voltages to temperature values for a variety of electric motors. The motor driver controller is further configured to determine an expected winding resistance value based on the determined temperature value using a resistance mapping. The resistance mapping maps winding resistance values to temperature values for a variety of electric motors. The motor driver controller is further configured to measure a winding resistance of the electric motor, to compare the measured winding resistance of the electric motor to the expected winding resistance value, and to output a match result indication based on the comparison. The match result indicates whether or not the correct motor is connected to the motor driver controller.

When the measured winding resistance of the electric motor matches the expected winding resistance value, this means that the electric motor that is currently connected to the motor driver controller matches the expected electric motor. In this case, the motor driver controller can safely operate the electric motor using the current motor driver profile that is installed on the motor driver controller.

When the measured winding resistance of the electric motor does not match the expected winding resistance value, this means that the electric motor is not connected to an expected electric motor. In this case, the motor driver controller will need to be reconnected to the appropriate type of electric motor or an appropriate motor driver profile will need to be obtained for the electric motor that is currently coupled to the motor driver controller.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Motor Driving System Overview

Figure 1:
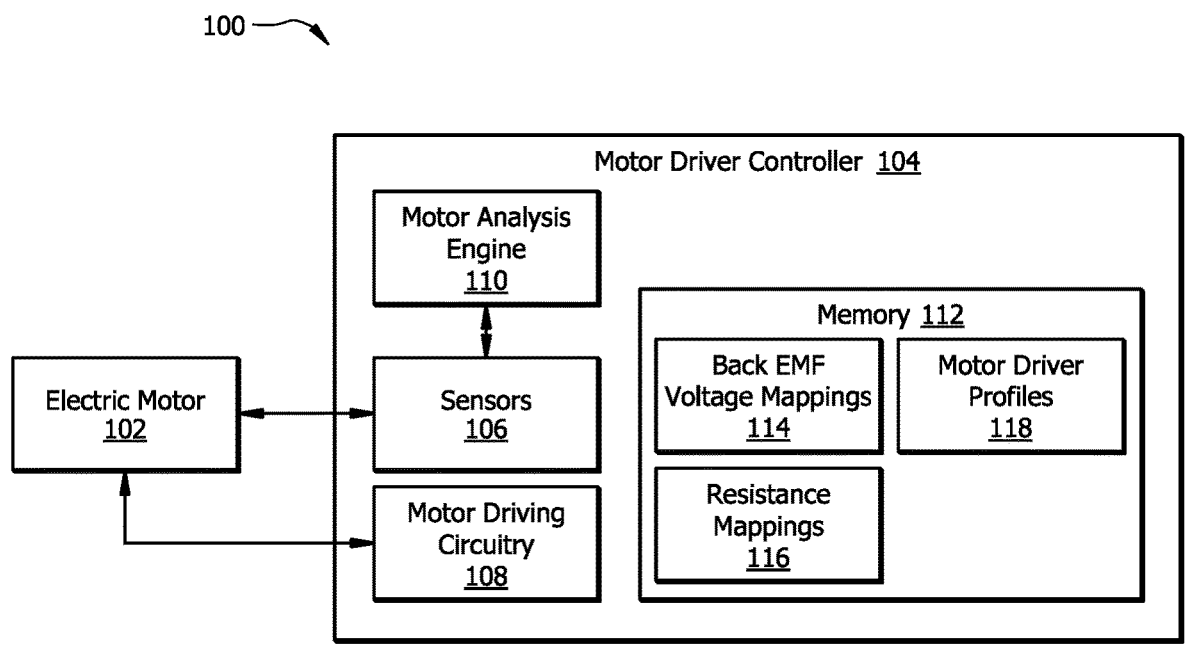
FIG. 1 is a schematic diagram of an embodiment of a motor driving system.

FIG. 1 is a schematic diagram of an embodiment of a motor driving system 100. The motor driving system 100 is configured to control the operation of one or more electric motors 102. In one embodiment, the motor driving system 100 may be employed to control components of a Heating, Ventilation, and Air Condition (HVAC) system. For example, the motor driving system 100 may be configured to control the operation of an electric motor for a furnace, a condenser, an air handler, or any other suitable type of HVAC equipment. In other embodiments, the motor driving system 100 may be employed to control the operation of electric motors for any other suitable type of system or application.

In one embodiment, the motor driving system 100 includes one or more electric motors 102 and one or more motor driver controllers 104. The motor driving system 100 may be configured as shown in FIG. 1 or in any other suitable configuration.

Electric Motor

Examples of an electric motor 102 include, but are not limited to, a direct current (DC) motor, an alternating current (AC) motor, or any other suitable type of electrical motor. For example, an electric motor 102 may be a DC motor that comprises a stator magnet, an armature conductor, a commutator, brushes, a winding, and/or any other suitable combination of components as would be appreciated by one of ordinary skill in the art. The electric motor 102 is configured to provide a rotational force in response to receiving an electrical signal, for example, a current signal or a voltage signal. For example, an electric motor 102 may be configured to rotate an impeller, fan blades, a pump, or any other suitable type of component. The electric motor 102 may be a ½-horsepower motor, a ¾-horsepower motor, a 1-horsepower motor, or any other suitable size electric motor.

Motor Driver Controller

In one embodiment, the motor driver controller 104 comprises a plurality of sensors 106, motor driving circuitry 108, a motor analysis engine 110, and a memory 112. The motor driver controller 104 is operably coupled to the electric motor 102 and configured to provide electrical signals for controlling the operation of the electric motor 102. For example, the motor driver controller 104 may be connected to the electric motor 102 via the motor driving circuitry 108. The motor driver controller 104 may be configured as shown in FIG. 1 or in any other suitable configuration. For example, the plurality of sensors 106 and/or the motor driving circuitry 108 may be components that are external from the motor driver controller 104.

Sensors

The plurality of sensor 106 may comprise a temperature sensor, a voltage sensor, a current sensor, a resistance sensor, a rotor saliency sensor, or any other suitable type of sensor. The plurality of sensors 106 are in signal communication with a processor (e.g. processor 502 in FIG. 5) of the motor driver controller 104 and are configured to provide data measurements about the electric motor 102 to the processor of the motor driver controller 104. In one embodiment, the plurality of sensors 106 comprises a voltage sensor that is configured to measure a back electromotive force (EMF) voltage of the electric motor 102. The plurality of sensors 106 may also comprise a resistance sensor that is configured to measure a winding resistance of the electric motor 102. The plurality of sensor 106 may also include one or more temperature sensors that are configured to measure the temperature of the electric motor 102 at various locations.

Motor Driving Circuitry

The motor driving circuitry 108 is configured to provide electrical signals for controlling the operation of the electric motor 102. For example, the motor driving circuitry 108 may be configured to receive a first electrical signal or command from a processor (e.g. processor 502 in FIG. 5) of the motor driver controller 104 and to output a second electrical signal to the electric motor 102 based on the first electrical signal. The motor driving circuitry 108 may comprise an H-bridge, relays, semiconductor switches, or any other suitable types of circuitry for providing electrical power to the electric motor 102 as would be appreciated by one of ordinary skill in the art.

Motor Analysis Engine

The motor analysis engine 110 is configured to analyze the electric motor 102 that is connected to the motor driver controller 104 to determine whether or not the correct or expected electric motor 102 is attached to the motor driver controller 104. The process allows the motor analysis engine 110 to confirm that the correct or expected electric motor 102 is attached to the motor driver controller 104 before fully utilizing the electric motor 102 which may potentially damage the electric motor 102 and result in downtime for the system 100. In response to determining that the correct or expected electric motor 102 is attached to the motor driver controller 104, the motor driver controller 104 can safely operate the electric motor 102. In response to determining that an incorrect electric motor 102 is attached to the motor driver controller 104, the motor analysis engine 110 may trigger a notification to alert an operator about the motor mismatch. In some embodiments, the motor analysis engine 110 is further configured to determine which electric motor 102 is actually connected to the motor driver controller 104 and may switch the motor driver profile 118 that is used to operate the electric motor 102. In this configuration, the motor analysis engine 110 is able to modify how the motor driver controller 104 operates the electric motor 102 to avoid damaging the electric motor 102 and causing any downtime for the system 100. An example of the motor analysis engine 110 in operation is described in FIG. 2. Details about the hardware configuration of the motor analysis engine 110 are described below in FIG. 5.

The memory 112 is operable to store back EMF voltage mappings 114, resistance mappings 116, motor driver profiles 118, and any other suitable type of data for the motor driver controller 104.

Back EMF Voltage Mappings

The back EMF voltage mappings 114 and the resistance mappings 116 are tables, mapping functions, or datasets that are generated and compiled based on previous test data for multiple electric motors 102. The electric motors 102 may include different types of electric motors 102 from the same manufacturer and/or different electric motors 102 from different manufacturers. The back EMF voltage mappings 114 and the resistance mappings 116 are generally configured to provide combinations of information that can be used to uniquely identify a particular type of electric motor 102.

Figure 3:
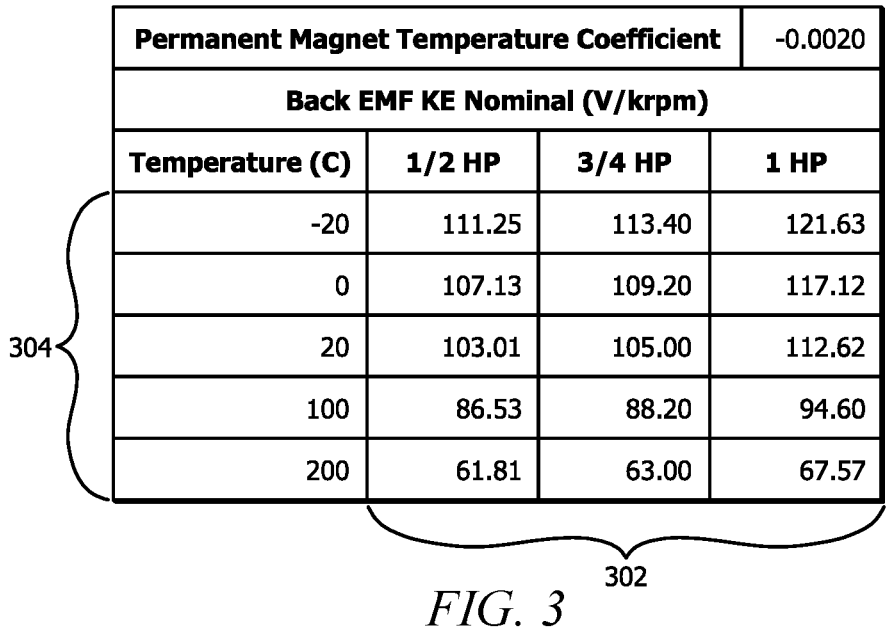
FIG. 3 is an example of a back electromotive (EMF) voltage mapping.

In one embodiment, a back EMF voltage mapping 114 is configured to provide a mapping between back electromotive force voltages and temperature values for multiple types of electric motors 102. An example of a back EMF voltage mapping 114 is shown in FIG. 3. In this example, the back EMF voltage mapping 114 provides a mapping between back EMF voltage values 302 and temperature values 304 for multiple types of electric motors 102. The temperature values 304 range from minus twenty degrees Celsius to two hundred degrees Celsius. In other examples, the back EMF voltage mapping 114 may include any other suitable range of temperature values 304. The back EMF voltage mapping 114 may also use any suitable increment values between the temperature values 304. The temperature values 304 are mapped to corresponding back EMF voltages 302. The back EMF voltages 302 are values that may be based previously determined testing results and/or datasheets for the electric motors 102.

Resistance Mappings

Figure 4:
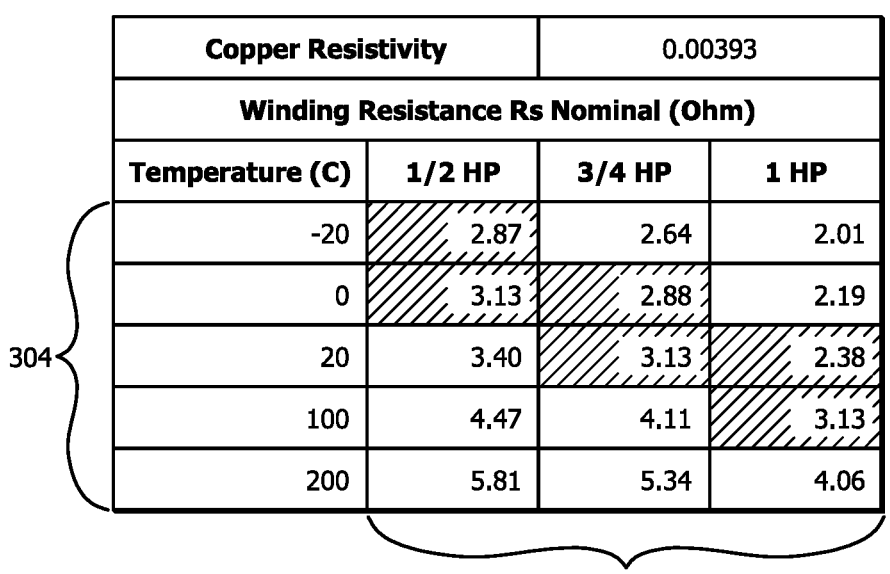
FIG. 4 is an example of a winding resistance mapping.

In one embodiment, a resistance mapping 116 is configured to provide a mapping between winding resistance values and temperature values for multiple types of electric motors 102. An example of a resistance mapping 116 is shown in FIG. 4. In this example, the resistance mapping 116 provides a mapping between temperature values 304 and winding resistance values 402 for multiple types of electric motors 102. The temperature values 304 range from minus twenty degrees Celsius to two hundred degrees Celsius. In other examples, the resistance mapping 116 may include any other suitable range of temperature values 304. The resistance mapping 116 may also use any suitable increment values between the temperature values 304. The temperature values 304 are mapped to corresponding winding resistances 402. The winding resistances 402 are values that may be based previously determined testing results and/or datasheets for the electric motors 102.

Motor Driver Profile

A motor driver profile 118 generally comprises settings, commands, and/or instructions for operating an electric motor 102. For example, a motor driver profile 118 may comprise voltage settings, current settings, proportional-integral-derivative (PID) controller settings, or any other suitable type of settings for operating an electric motor 102. Each motor driver profile 118 may be uniquely associated with a particular type of electric motor 102. For example, the motor driver controller 104 may comprise a first motor driver profile 118 for a ½-horsepower motor 102, a second motor driver profile 118 for a ¾-horsepower motor 102, a third motor driver profile 118 for a 1-horsepower motor 102, and so on. Each motor driver profile 118 may be associated with an identifier that uniquely identifies a type of electric motor 102. The identifier may be an alphanumeric identifier or any other suitable type of identifier.

Motor Analysis Process

Figure 2:
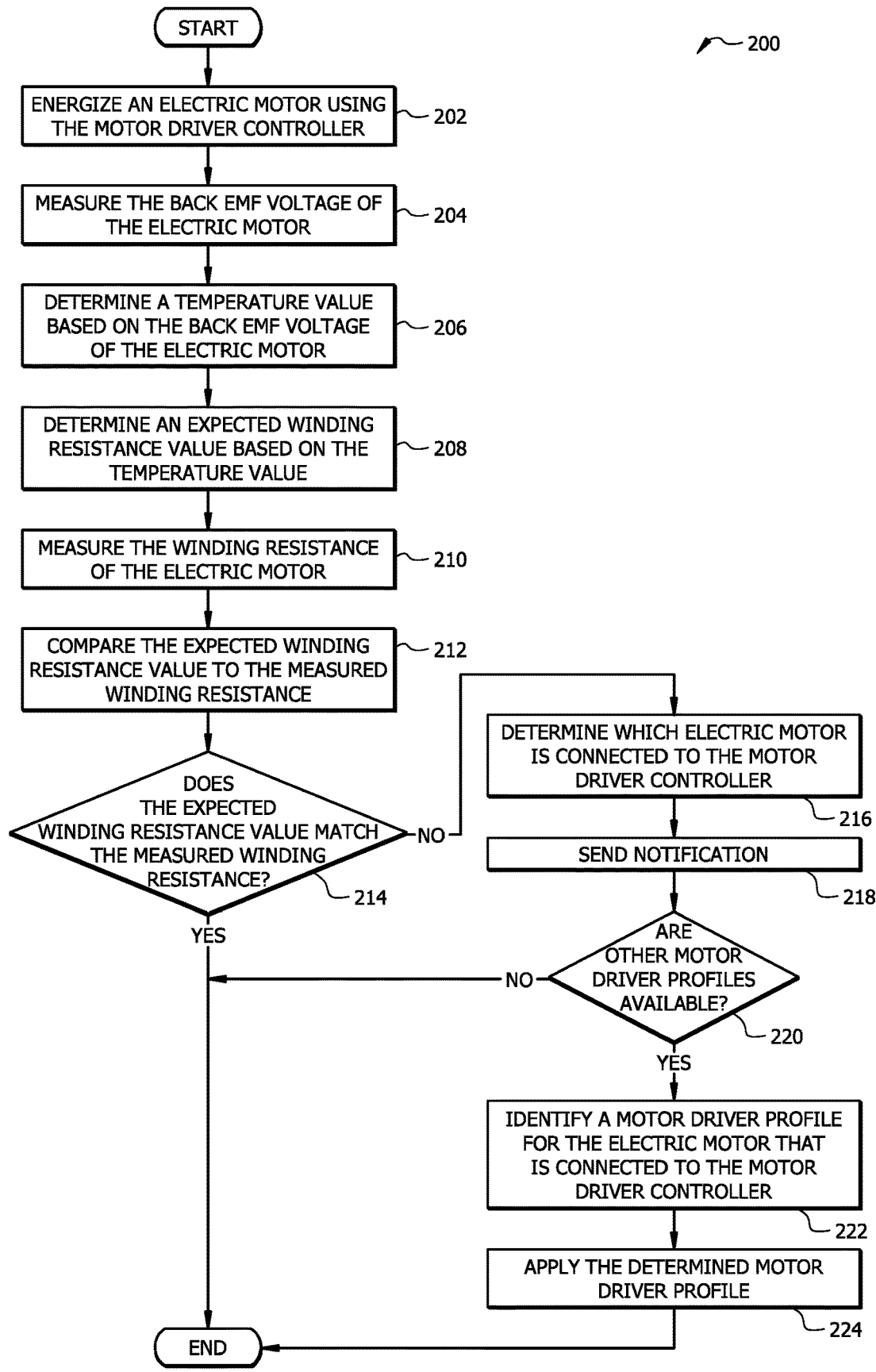
FIG. 2 is a flowchart of an embodiment of a motor analysis process.

FIG. 2 is a flowchart of an embodiment of a motor analysis process 200. The motor driver controller 104 may employ process 200 to ensure that the correct or expected electric motor 102 is coupled to the motor driver controller 104 before fully utilizing the electric motor 102. Process 200 allows the motor driver controller 104 to notify an operator when the incorrect electric motor 102 is coupled to the motor driver controller 104. In some embodiments, the motor driver controller 104 may be configured to dynamically change the motor driver profile 118 that is used based on the type of electric motor 102 that is connected to the motor driver controller 104. This process allows the motor driver controller 104 to safely operate the electric motor 102 that is connected to the motor driver controller 104 using the appropriate motor driver profile 118. Operating the incorrect electric motor 102 with the wrong motor driver profile 118 may result in underpowering the electric motor 102 or overpowering the electric motor 102 which may cause damage to the electric motor 102 and/or its load.

At step 202, the motor driver controller 104 energizes an electric motor 102 that is coupled to the motor driver controller 104. Here, the motor driver controller 104 outputs an electrical signal that provides electrical power to the electric motor 102. For example, the motor driver controller 104 may send a first electrical signal to the motor driving circuitry 108 that triggers the motor driving circuitry 108 to provide electrical power to the electric motor 102. In response to receiving the electrical power, the electric motor 102 is energized and ready to provide a rotational force to a load. The motor controller circuitry 108 may provide any suitable type of voltage or current signal to energize the electric motor 102. After energizing the electric motor 102, the motor driver controller 104 may also send one or more electrical signals to the motor controller circuitry 108 to begin operating the electric motor 102. For example, the motor driver controller 104 may provide an electrical signal that triggers the electric motor 102 to provide a rotational force to a load.

At step 204, the motor driver controller 104 measures the back EMF voltage of the motor 102. Here, the motor driver controller 104 receives measured back EMF voltage data from one or more voltage sensors that are operably coupled to the electric motor 102 after the electric motor 102 is energized and/or operating.

At step 206, the motor driver controller 104 determines a temperature value based on the measured back EMF voltage of the electric motor 102. After obtaining a measured back EMF voltage, the motor driver controller 104 uses the measured back EMF voltage with the back EMF voltage mapping 114 to determine a corresponding temperature value 304. As an example, the motor driver controller 104 is expecting to be connected to a ½-horsepower motor 102. In this example, the motor driver controller 104 may measure a back EMF voltage of one hundred and four volts. Referring to the example of the back EMF voltage mapping 114 in FIG. 3, the motor driver controller 104 uses the measured back EMF voltage to identify a back EMF voltage 302 that closest matches the measured back EMF voltage. The motor driver controller 104 then determines a temperature value 304 that corresponds with the identified back EMF voltage 302. In this example, the motor driver controller 104 may determine that the temperature value 304 of twenty degrees best corresponds with the measured back EMF voltage.

Returning to FIG. 2 at step 208, the motor driver controller 104 determines an expected winding resistance value based on the determined temperature value 304. After determining a temperature value 304 using the back EMF voltage mapping 114, the motor driver controller 104 uses the determined temperature value 304 with the resistance mapping 116 to confirm whether the expected electric motor 102 is actually connected to the motor driver controller 104. Referring to the example of the resistance mapping 116 in FIG. 4, the motor driver controller 104 uses the determined temperature value 304 which has a value of twenty degrees to determine a corresponding expected winding resistance value 402 from the resistance mapping 116. In this example, the motor driver controller 104 determines that the expected winding resistance value 402 for a ½-horsepower motor is 3.4 Ohms.

Returning to FIG. 2 at step 210, the motor driver controller 104 measures the winding resistance of the electric motor 102. Here, the motor driver controller 104 receives measured winding resistance data from one or more resistance sensors that are operably coupled to the electric motor 102.

At step 212, the motor driver controller 104 compares the expected winding resistance value 402 to the measured winding resistance of the electric motor 102. By comparing the expected resistance value 402 to the measured resistance of the electric motor 102, the motor driver controller 104 can determine whether the correct electric motor 102 is coupled to the motor driver controller 104.

At step 214, the motor driver controller 104 determines whether the expected winding resistance value 402 matches the measured winding resistance of the electric motor 102. The motor driver controller 104 may terminate process 200 in response to determining that the expected winding resistance value 402 matches the measured winding resistance of the electric motor 102. In this case, the motor driver controller 104 determines that the correct or expected electric motor 102 is coupled to the motor driver controller 104 because the expected winding resistance value 402 matches the measured winding resistance of the electric motor 102. This means that the motor driver controller 104 can safely operate the electric motor 102 using the current motor driver profile 118. For example, the motor driver controller 104 may begin sending signals to the motor driver circuitry 108 to operate the electric motor 102 in accordance with the current motor driver profile 118.

In some embodiments, the motor driver controller 104 sends a notification that indicates a match result to an operator. The notification informs the operator that the correct electric motor 102 is coupled to the motor driver controller 104. For example, the match result may indicate that the expected winding resistance value 402 matches the measured winding resistance of the electric motor 102. The motor driver controller 104 may send a notification using a graphical user interface (e.g. a liquid crystal display (LCD) screen), using a combination of light-emitting diodes (LEDs), or using any other suitable interface for notifying the operator.

The motor driver controller 104 proceeds to step 216 in response to determining that the expected winding resistance value does not match the measured winding resistance of the electric motor 102. In this case, the motor driver controller 104 determines that the incorrect electric motor 102 is coupled to the motor driver controller 104 because the expected winding resistance value 402 does not match the measured winding resistance of the electric motor 102. This means that the motor driver controller 104 cannot safely operate the electric motor 102 using the current motor driver profile 118. Operating the incorrect electric motor 102 with the wrong motor driver profile 118 may result in underpowering the electric motor 102 or overpowering the electric motor 102 which may cause damage to the electric motor 102 and its load.

At step 216, the motor driver controller 104 determines which type of electric motor 102 is connected to the motor driver controller 104 based on its measured winding resistance. As an example, the measured winding resistance may have a value of 2.4 Ohms. Returning to the example of the resistance mapping 116 in FIG. 4, the motor driver controller 104 may determine that the measured winding resistance closest matches a winding resistance 402 value of 2.38 Ohms which correspond with a 1-horsepower motor. In this example, the motor driver controller 104 determines that a 1-horsepower motor is likely connected to the motor driver controller 104.

At step 218, the motor driver controller 104 sends a notification that indicates a match result to an operator about the determined type of electric motor 102 that is connected to the motor driver controller 104. For example, the match result may inform the operator that the incorrect electric motor 102 is coupled to the motor driver controller 104. The match result may also provide information about the type of electric motor 102 that is actually coupled to the motor driver controller 104. The motor driver controller 104 may send a notification using a graphical user interface (e.g. an LCD screen), using a combination of LEDs, or using any other suitable interface for notifying the operator. For example, the motor driver controller 104 may indicate a mismatch and identify the electric motor 102 that is currently connected to the motor driver controller 104 using a coded message and LEDs. For instance, the LEDs may blink in a predetermined pattern that indicates there is a mismatch and indicates which type of electric motor 102 is connected to the motor driver controller 104. As another example, the motor driver controller 104 may indicate a mismatch and identify the electric motor 102 that is currently connected to the motor driver controller 104 using text on an LCD screen. In other examples, the motor driver controller 104 may use any other suitable technique for informing an operator about the mismatch and the electric motor 102 that is coupled to the motor driver controller 104.

At step 220, the motor driver controller 104 determines whether there are other motor driver profiles 118 available. In some embodiments, the motor driver controller 104 may only be configured with a motor driver profile 118 for the electric motor 102 that is expected to be coupled to the motor driver controller 104. In this case, the motor driver controller 104 determines that there are no other motor driver profiles 118 available. The motor driver controller 104 terminates process 200 in response to determining that other motor driver profiles 118 not available. In other words, the motor driver controller 104 is unable to use another motor driver profile 118 to safely operate the electric motor 102 which means that the motor driver controller 104 will need to be reconnected to the appropriate type of electric motor 102 or an appropriate motor driver profile 118 will need to be obtained for the electric motor 102 that is currently coupled to the motor driver controller 104.

The motor driver controller 104 proceeds to step 222 in response to determining that other motor driver profiles 118 are available. In this case, the motor driver controller 104 is configured with multiple motor driver profiles 118 that can be used for different types of electric motors 102 that may be coupled to the motor driver controller 104. At step 222, the motor driver controller 104 identifies a motor driver profile 118 for the electric motor 102 that is connected to the motor driver controller 104. Continuing with the previous example, the motor driver controller 104 determined that a 1-horsepower motor is coupled to the motor driver controller 104. The motor driver controller 104 will identify a motor driver profile 118 that corresponds with the identified electric motor 102. This process allows the motor driver controller 104 to dynamically adjust which motor driver profile 118 is used so that the electric motor 102 can be safely operated.

At step 224, the motor driver controller 104 applies the determined motor driver profile 118 to operate the electric motor 102 that is connected to the motor driver controller 104. Once the correct motor driver profile 118 has been identified for the electric motor 102 that is coupled to the motor driver controller 104, the motor driver controller 104 can safely operate the electric motor 102 using the identified motor driver profile 118. For example, the motor driver controller 104 may begin sending signals to the motor driver circuitry 108 to operate the electric motor 102 in accordance with the identified motor driver profile 118.

Hardware Configuration for a Motor Driver Controller

Figure 5:
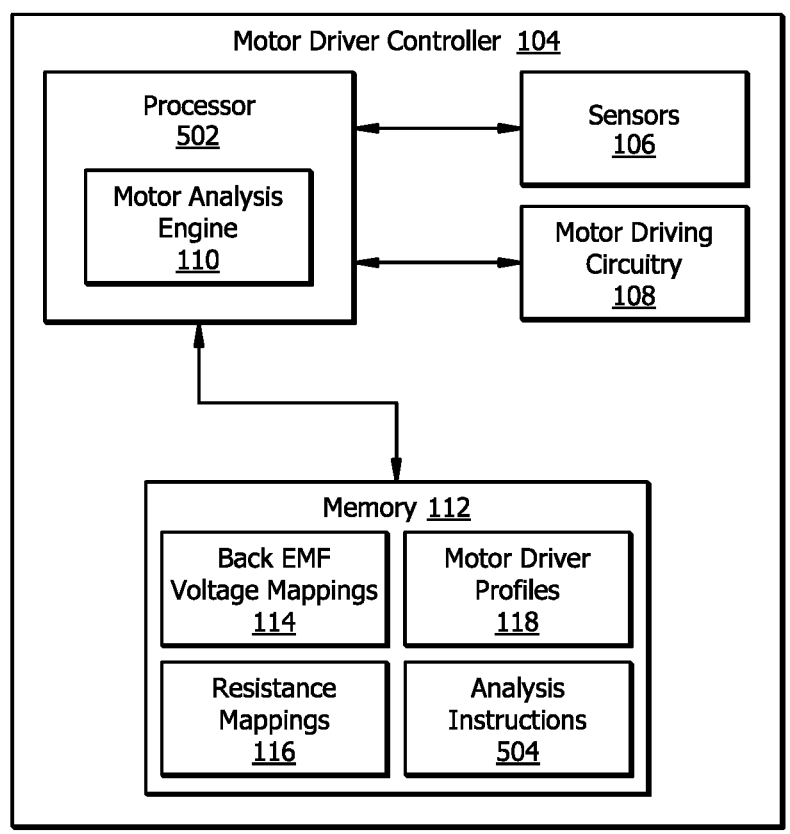
FIG. 5 is a schematic diagram of a motor driver controller configured to perform the motor analysis process.

FIG. 5 is a schematic diagram of an embodiment of a motor driver controller 104. The motor driver controller 104 comprises a processor 502, a memory 112, sensors 106, and motor driving circuitry 108. The motor driver controller 104 may be configured as shown or in any other suitable configuration.

The processor 502 comprises one or more processors operably coupled to the memory 112. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 112. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute motor analysis instructions 504 to implement a motor analysis engine 110. In this way, processor 502 may be a special-purpose computer designed to implement the functions disclosed herein. In an embodiment, the motor analysis engine 110 is implemented using logic units, FPGAs, ASICs, DSPs, or any other suitable hardware. The motor analysis engine 110 is configured to operate as described in FIGS. 1-2. For example, the motor analysis engine 110 may be configured to perform the steps of process 200 as described in FIG. 2.

The memory 112 is operable to store any of the information described above with respect to FIGS. 1-4 along with any other data, instructions, logic, rules, or code operable to implement the function(s) described herein when executed by the processor 502. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store motor analysis instructions 504, back EMF voltage mappings 114, resistance mappings 116, motor driver profiles 118, and/or any other data or instructions. The motor analysis instructions 504 may comprise any suitable set of instructions, logic, rules, or code operable to execute the motor analysis engine 110. The back EMF voltage mappings 114, the resistance mappings 116, and the motor driver profiles 118 are configured similar to the back EMF voltage mappings 114, the resistance mappings 116, and the motor driver profiles 118 described in FIGS. 1-4, respectively.

The processor 502 is in signal communication with the sensors 106. The sensors 106 may be configured similar to the sensors 106 described in FIGS. 1-2. The processor 502 is configured to receive data from the sensors 106. For example, the processor 502 may be configured to receive temperature measurements, resistance measurements, voltage measurements, current measurements, or any other suitable type of data from the sensors 106.

The processor 502 is in signal communication with the motor driving circuitry 108. The motor driving circuitry 108 may be configured similarly to the motor driving circuitry 108 described in FIGS. 1-2. The processor 502 is configured to operate the motor driving circuitry 108 to control the operation of an electric motor 102. For example, the processor 502 may be configured to send any suitable type of commands or instructions to the motor driving circuitry 108 to energize the electric motor 102 and to control the operation (e.g. the speed) of the electric motor 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A motor driving system, comprising:
  motor driving circuitry configured to operate an electric motor; and
  a motor driver controller operably coupled to the motor driving circuitry, comprising:
    a memory operable to store:
      a back electromotive force voltage mapping configured to map back electromotive force voltages to temperature values for a plurality of electric motors;
      a resistance mapping configured to map winding resistance values to temperature values for the plurality of electric motors; and
    a processor operably coupled to the memory, operable to:
      send a signal to the motor driving circuitry to energize the electric motor;
      measure a back electromotive force voltage of the electric motor;
      determine a temperature value based on the measured back electromotive force voltage using the back electromotive force voltage mapping;
      determine an expected winding resistance value based on the determined temperature value using the resistance mapping;
      measure a winding resistance of the electric motor;
      compare the measured winding resistance of the electric motor to the expected winding resistance value; and output a match result indication based on the comparison.

2. The system of claim 1, wherein the output match result indicates a match when the measured winding resistance of the electric motor matches the expected winding resistance value.

3. The system of claim 1, wherein:
the memory is further operable to store a motor driver profile that comprises settings for operating the electric motor; and
the processor is further configured to:
determine that the match result indicates a match between the measured winding resistance of the electric motor and the expected winding resistance value; and
send signals to the motor driving circuitry to operate the electric motor in accordance with the motor driver profile in response to determining that the match result indicates a match between the measured winding resistance of the electric motor and the expected winding resistance value.

4. The system of claim 1, wherein the output match result indicates a mismatch when the measured winding resistance of the electric motor does not match the expected winding resistance value.

5. The system of claim 1, wherein the processor is further configured to:
determine that the match result indicates a mismatch between the measured winding resistance of the electric motor and the expected winding resistance value;
identify a second electric motor from the resistance mapping that corresponds with the determined temperature value and the measured winding resistance in response to determining that the match result indicates a mismatch between the measured winding resistance of the electric motor and the expected winding resistance value; and
output information that identifies the second electric motor.

6. The system of claim 1, wherein:
the memory is further operable to store a plurality of motor driver profiles, wherein:
each motor driver profile corresponds with one of the plurality of electric motors; and
each motor driver profile comprises settings for operating an electric motor; and
the processor is further configured to:
determine that the match result indicates a mismatch between the measured winding resistance of the electric motor and the expected winding resistance value;
identify a second electric motor from the resistance mapping that corresponds with the determined temperature value and the measured winding resistance in response to determining that the match result indicates a mismatch between the measured winding resistance of the electric motor and the expected winding resistance value;
identify a motor driver profile that corresponds with the second electric motor; and
send signals to the motor driving circuitry to operate the electric motor in accordance with the motor driver profile.

7. The system of claim 1, wherein outputting the match result indication comprises outputting a coded message using light-emitting diodes.

8. A motor analysis method, comprising:
sending a signal to motor driving circuitry to energize an electric motor;
measuring a back electromotive force voltage of the electric motor;
determining a temperature value based on the measured back electromotive force voltage using a back electromotive force voltage mapping, wherein the back electromotive force voltage mapping is configured to map back electromotive force voltages to temperature values for a plurality of electric motors;
determining an expected winding resistance value based on the determined temperature value using a resistance mapping, wherein the resistance mapping configured to map winding resistance values to temperature values for the plurality of electric motors;
measuring a winding resistance of the electric motor;
comparing the measured winding resistance of the electric motor to the expected winding resistance value; and
outputting a match result indication based on the comparison.

9. The method of claim 8, wherein the output match result indicates a match when the measured winding resistance of the electric motor matches the expected winding resistance value.

10. The method of claim 8, further comprising:
determining that the match result indicates a match between the measured winding resistance of the electric motor and the expected winding resistance value; and
sending signals to the motor driving circuitry to operate the electric motor in accordance with a motor driver profile in response to determining that the match result indicates a match between the measured winding resistance of the electric motor and the expected winding resistance value, wherein the motor driver profile that comprises settings for operating the electric motor.

11. The method of claim 8, wherein the output match result indicates a mismatch when the measured winding resistance of the electric motor does not match the expected winding resistance value.

12. The method of claim 8, further comprising:
determining that the match result indicates a mismatch between the measured winding resistance of the electric motor and the expected winding resistance value;
identifying a second electric motor from the resistance mapping that corresponds with the determined temperature value and the measured winding resistance in response to determining that the match result indicates a mismatch between the measured winding resistance of the electric motor and the expected winding resistance value; and
outputting information that identifies the second electric motor.

13. The method of claim 8, further comprising:
determining that the match result indicates a mismatch between the measured winding resistance of the electric motor and the expected winding resistance value;
identifying a second electric motor from the resistance mapping that corresponds with the determined temperature value and the measured winding resistance in response to determining that the match result indicates a mismatch between the measured winding resistance of the electric motor and the expected winding resistance value;
identifying a motor driver profile from among a plurality of motor driver profiles that corresponds with the second electric motor, wherein the motor driver profile that comprises settings for operating the second electric motor; and sending signals to the motor driving circuitry to operate the electric motor in accordance with the motor driver profile.

14. The method of claim 8, wherein outputting the match result indication comprises outputting a coded message using light-emitting diodes.

15. A computer program comprising executable instructions stored in a non-transitory computer readable medium that when executed by a processor causes the processor to:
send a signal to motor driving circuitry to energize an electric motor;
measure a back electromotive force voltage of the electric motor;
determine a temperature value based on the measured back electromotive force voltage using a back electromotive force voltage mapping, wherein the back electromotive force voltage mapping is configured to map back electromotive force voltages to temperature values for a plurality of electric motors;
determine an expected winding resistance value based on the determined temperature value using a resistance mapping, wherein the resistance mapping configured to map winding resistance values to temperature values for the plurality of electric motors;
measure a winding resistance of the electric motor;
compare the measured winding resistance of the electric motor to the expected winding resistance value; and
output a match result indication based on the comparison.

16. The computer program of claim 15, wherein the output match result indicates a match when the measured winding resistance of the electric motor matches the expected winding resistance value.

17. The computer program of claim 15, further comprising further comprising instructions that when executed by the processor causes the processor to:
determine that the match result indicates a match between the measured winding resistance of the electric motor and the expected winding resistance value; and
send signals to the motor driving circuitry to operate the electric motor in accordance with a motor driver profile in response to determining that the match result indicates a match between the measured winding resistance of the electric motor and the expected winding resistance value, wherein the motor driver profile that comprises settings for operating the electric motor.

18. The computer program of claim 15, wherein the output match result indicates a mismatch when the measured winding resistance of the electric motor does not match the expected winding resistance value.

19. The computer program of claim 15, further comprising instructions that when executed by the processor causes the processor to:
determine that the match result indicates a mismatch between the measured winding resistance of the electric motor and the expected winding resistance value;
identify a second electric motor from the resistance mapping that corresponds with the determined temperature value and the measured winding resistance in response to determining that the match result indicates a mismatch between the measured winding resistance of the electric motor and the expected winding resistance value; and
output information that identifies the second electric motor.

20. The computer program of claim 15, further comprising instructions that when executed by the processor causes the processor to:
determine that the match result indicates a mismatch between the measured winding resistance of the electric motor and the expected winding resistance value;
identify a second electric motor from the resistance mapping that corresponds with the determined temperature value and the measured winding resistance in response to determining that the match result indicates a mismatch between the measured winding resistance of the electric motor and the expected winding resistance value;
identify a motor driver profile from among a plurality of motor driver profiles that corresponds with the second electric motor, wherein the motor driver profile that comprises settings for operating the second electric motor; and
send signals to the motor driving circuitry to operate the electric motor in accordance with the motor driver profile.

* * * * *